US008339333B2

(12) United States Patent  
Casner et al.

(10) Patent No.: US 8,339,333 B2
(45) Date of Patent: Dec. 25, 2012

(54) METHODS OF REDUCING PERCEIVED IMAGE CROSSTALK IN A MULTIVIEW DISPLAY (75) Inventors: Glenn E. Casner, Woodbury, MN (US); John C. Schultz, Afton, MN (US); Michael J. Sykora, Deer Park, WI (US); Brian E. Brooks, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1041 days.

(21) Appl. No.: 11/968,332

(22) Filed: Jan. 2, 2008

(65) Prior Publication Data

US 2009/0167639 A1 Jul. 2, 2009

(51) Int. Cl.
*G09G 3/20* (2006.01)
*G09G 5/10* (2006.01)
(52) U.S. Cl. .......................... 345/58; 345/690; 345/691
(58) Field of Classification Search .................. 345/3–9, 345/32, 58, 204–215, 690–699, 87–104; 362/600–634, 330–340; 348/42–60
See application file for complete search history.

(56) References Cited

U.S. PATENT DOCUMENTS

| 4,266,240 | A | | 5/1981 | Levy |
| 4,287,528 | A | | 9/1981 | Levy |
| 4,517,592 | A | | 5/1985 | Levy |
| 5,670,973 | A | * | 9/1997 | Bassetti et al. ................. 345/58 |
| 5,774,261 | A | | 6/1998 | Omori |
| 6,573,928 | B1 | * | 6/2003 | Jones et al. ..................... 348/51 |
| 7,530,721 | B2 | | 5/2009 | Mi et al. |
| 2002/0122585 | A1 | | 9/2002 | Swift |
| 2005/0052750 | A1 | | 3/2005 | King |
| 2005/0275668 | A1 | * | 12/2005 | Feng ............................. 345/694 |
| 2005/0276071 | A1 | | 12/2005 | Sasagawa |
| 2006/0132511 | A1 | * | 6/2006 | Feng ............................. 345/694 |
| 2006/0145969 | A1 | * | 7/2006 | Fish et al. ....................... 345/77 |
| 2007/0024968 | A1 | | 2/2007 | Kim |
| 2007/0085814 | A1 | * | 4/2007 | Ijzerman et al. .............. 345/102 |
| 2007/0121028 | A1 | | 5/2007 | Mihajlovic |
| 2007/0126691 | A1 | * | 6/2007 | Lin et al. ....................... 345/102 |

(Continued)

FOREIGN PATENT DOCUMENTS

EP 0819359 2/1999

(Continued)

OTHER PUBLICATIONS

Ishikawa et al. "New Design for a Highly Collimating Turning Film," Eastman Kodak Company, SID 06 Digest, p. 514-517, 2006.

(Continued)

*Primary Examiner* — Alexander Eisen
*Assistant Examiner* — Patrick F Marinelli (57) ABSTRACT

Methods of reducing perceived image crosstalk in a multiview display. One method includes providing an image stream to a display having a horizontal dimension that extends from a first side of the display to an opposing second side of the display. The image stream includes a temporal sequence of images where at least a first image view and then a second image view are displayed on the display in a time sequential manner. The temporal sequence of images are conditioned before being displayed in order to reduce perceived displayed image crosstalk between the first and second image views. The conditioning includes modifying a color intensity of at least selected pixels along the horizontal dimension based on a non-constant crosstalk correction function for the horizontal dimension.

18 Claims, 5 Drawing Sheets

U.S. PATENT DOCUMENTS

| | | | | |
|---|---|---|---|---|
| 2007/0222724 | A1* | 9/2007 | Ueno et al. | 345/87 |
| 2007/0296865 | A1* | 12/2007 | Mino et al. | 348/571 |
| 2012/0113153 | A1* | 5/2012 | Casner | 345/690 |

FOREIGN PATENT DOCUMENTS

| | | |
|---|---|---|
| GB | 2406731 | 4/2005 |
| JP | 8331600 | 12/1996 |
| JP | 10011607 | 1/1998 |
| JP | 2000134644 | 10/1998 |
| JP | 2001045524 | 2/2001 |
| JP | 2001054143 | 2/2001 |
| JP | 2001298754 | 10/2001 |
| JP | 2005077437 | 3/2005 |
| WO | WO 2005/071474 | 8/2005 |

OTHER PUBLICATIONS

Iizerman et al., "Design of 2D/3D Switchable Displays", SID 2005 Digest, p. 98-101.

Kim et al., "A 2.4 inch 4-view 3D Display", IDW 2007, p. 2263-2266.

Smit et al., "Non-Uniform Crosstalk Reduction for Dynamic Scenes", IEEE Virtual Reality Conference Mar. 10-14, 2007, pp. 139-146.

F.A. Smit, et al., "Three Extensions to Subtractive Crosstalk Reduction", IPT-EGVE Symposium (2007), pp. 1-9.

Konrad, et al., "Cancellation of Image Crosstalk in Time-Sequential Displays of Stereoscopic Video", IEEE Transactions on Image Processing, vol. 9, No. 5, May 2000.

Pommeray, et al., "Image Crosstalk Reduction in Stereoscopic Laser-Based Display Systems", Journal of Electronic Imaging 12(4), 689-696 (Oct. 2003).

Lipscomb, et al., "Reducing Crosstalk Between Stereoscopic Views", SPIE vol. 2177, pp. 92-96.

Woods et al., "Characterising Sources of Ghosting in Time-Sequential Stereoscopic Video Displays", presented at Stereoscopic Displays and Applications XIII, published in Stereoscopic Displays and Virtual Reality Systems IX, Proceedings of SPEI vol. 4660, San Jose, CA, Jan. 21-23, 2003.

Seuntiens, et al., "Perceptual Attributes of Crosstalk in 3D Images", Science Direct, Displays 26 (2005) 177-183.

* cited by examiner

METHODS OF REDUCING PERCEIVED IMAGE CROSSTALK IN A MULTIVIEW DISPLAY

FIELD

The present disclosure relates to methods of reducing perceived image crosstalk in a multiview display.

BACKGROUND

Multiview displays suffer from a disturbing effect called image cross-talk or image ghosting. Image cross-talk occurs when one viewpoint receives a stimulus that was intended for another viewpoint. This produces a perceived or visible shadow or ghost on that image that reduces, or even inhibits, the viewer's display experience.

Two types of image cross-talk in a display include optical image cross-talk and timing image cross-talk. Timing image cross-talk refers to the timing of the light source and presentation of the image from on the display panel. Thus, if a first view image fails to erase before the illumination for the second image is provided to the display panel, then the first view image will be visible from the incorrect viewpoint, leading to timing image cross-talk.

Optical image cross-talk refers to any non-ideal optical distribution of light from a first view spread, diffused or otherwise distributed into other views. For example if the light intensity from a first view image is non-zero at the spatial or angular location of a second view image, than, as with timing image cross-talk, the first view image will be visible from an incorrect viewpoint, leading to optical image cross-talk.

BRIEF SUMMARY

The present disclosure relates to methods of reducing perceived image crosstalk in a multiview display. In particular, this disclosure provides methods of conditioning multiview images to reduce perceived image crosstalk in a multiview display. This conditioning includes subtractive crosstalk reduction by altering or modifying pixel intensity of each image view so that the perceived image has a reduced amount of perceived image crosstalk thereby improving the viewing experience for an observer(s). In many embodiments, this conditioning is preformed by software that modifies color intensity of each multiview image frame of at least selected pixels of a horizontal display dimension by applying a known non-constant cross-talk function to the horizontal display dimension.

In a first embodiment, the method includes providing an image stream to a display. The display includes a horizontal dimension that extends from a first side of the display to an opposing second side of the display. The image stream includes a temporal sequence of images where at least a first image view and then a second image view is displayed on the display in a time sequential manner. The temporal sequence of images are conditioned before the temporal sequence of images is displayed on the display to reduce perceived displayed image crosstalk between at least the first image view and the second image view. The conditioning includes modifying a color intensity of, at least selected, pixels along the horizontal dimension based on a non-constant crosstalk correction function for the horizontal dimension.

In another embodiment, the method includes providing an image stream to a display. The display including a horizontal dimension that extends from a first side of the display to an opposing second side of the display. The image stream includes a temporal sequence of images where at least a first image view and then a second image view is displayed on the display in a time sequential manner. The temporal sequence of images are conditioned before the temporal sequence of images is displayed on the display to reduce perceived displayed image crosstalk between at least the first image view and the second image view. The conditioning includes modifying a color intensity of, at least selected, pixels along the horizontal dimension based on a non-constant crosstalk correction function for the horizontal dimension and rescaling a color intensity range of the first image view and second image view so that the modified color intensity is within the color intensity range.

In another embodiment, a method of reducing perceived image crosstalk in a multiview display includes providing an image stream to a display. The display includes a horizontal dimension that extends from a first side of the display to an opposing second side of the display. The image stream includes at least a first image view and a second image view. The first image view and the second image view are conditioned before the first image view and a second image view are displayed on the display to reduce perceived displayed image crosstalk between at least the first image view and the second image view. The conditioning includes modifying a color intensity of, at least selected, pixels along the horizontal dimension based on a non-constant crosstalk correction function for the horizontal dimension.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

The term "autostereoscopic" refers to displaying three-dimensional images that can be viewed without the use of special headgear or glasses on the part of the user or viewer. These methods produce depth perception in the viewer even though the image is produced by a flat device. The term stereoscopic 3D incorporates the field of autostereoscopic devices but also includes the stereoscopic 3D display case in which special headgear, e.g. shutter glasses or polarized glasses, are need to see stereoscopic 3D from a flat display.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

The present disclosure relates to methods of reducing perceived image crosstalk in a multiview display. This disclosure provides conditioning the image views to reduce perceived image crosstalk in a multiview display. This conditioning includes subtractive crosstalk reduction by altering or modifying pixel intensity of each image view so that the perceived image has a reduced amount of perceived image crosstalk thereby improving the viewing experience for an observer(s). In many embodiments, this conditioning is preformed by software that modifies color intensity of each image view frame of at least selected pixels of at least selected horizontal pixel lines by applying a known non-constant cross-talk function to the horizontal pixel lines. In many embodiments, this cross-talk function is determined empirically for the selected pixel lines and may be different along the pixel line for opposing directions of the pixel line. The modified images can be temporally displayed in sequence to reduce perceived image cross-talk. The disclosed method can be implemented to deal with non-uniform cross-talk and/or uniform cross-talk. For example, the cross-talk correction algorithm could correct for cross-talk on a pixel by pixel basis using detailed information regarding what the amount of cross-talk is at any particular display location. While the present invention is not so limited, an appreciation of various aspects of the invention will be gained through a discussion of the examples provided below.

Figure 1:
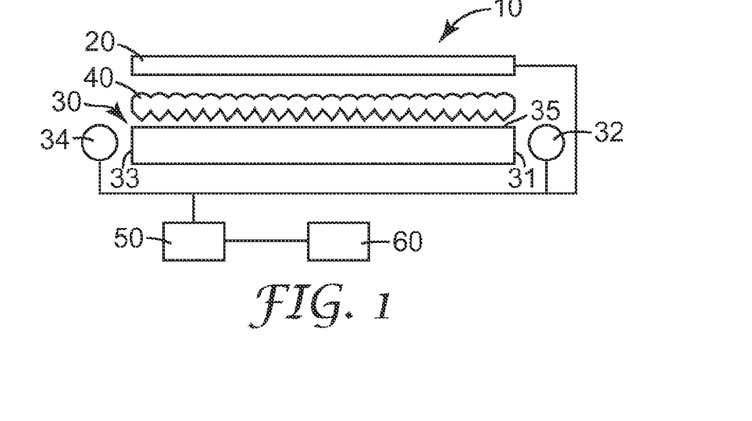
FIG. 1 is a schematic side view of an illustrative display apparatus.

FIG. 1 is a schematic side view of an illustrative stereoscopic display apparatus 10. The display apparatus includes a liquid crystal display panel 20 having a frame response time of less than 10 milliseconds, or less than 5 milliseconds, or less than 3 milliseconds, and a backlight 30 positioned to provide light to the liquid crystal display panel 20. The backlight 30 includes a right eye image solid state light source 32 and a left eye image solid state light source 34 capable of being modulated between the right eye image solid state light source 32 and the left eye image solid state light source 34 at a rate of at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While FIG. 1 is directed to any stereoscopic 3D backlight including those requiring shutterglasses or more than a single lightguide and associated liquid crystal display panel, the present disclosure is particularly useful for autostereoscopic displays. In other embodiments, the display is an OLED display, a plasma display, and the like.

A synchronization driving element 50 is electrically connected to the backlight 30 light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any transmissive liquid crystal display panel that has a frame response time of less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of at least 90 Hertz, or 100 Hertz, or 110 Hertz, or 120 Hertz, or greater than 120 Hertz. The illustrated backlight 30 includes a first light input surface 31 adjacent to the right eye image solid state light source 32 and an opposing second light input surface 33 adjacent to the left eye image solid state light source 34 and a light output surface 35. The solid state light sources can be any useful solid state light source that can be modulated at a rate of at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as white, red, blue, and/or green. The backlight can be a single layer of optically clear material with light sources at both ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Applications Publication Nos. 2005/0052750 and 2005/0276071, which are incorporated herein by reference as if fully set forth. These double sided prism films have an open angle of about 60 degrees and provide image separation of approximately equal to the distance between a viewer's eyes (i.e., about six degrees).

The image source 60 can be any useful image source capable of providing images frames (e.g., first image view and left image views) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
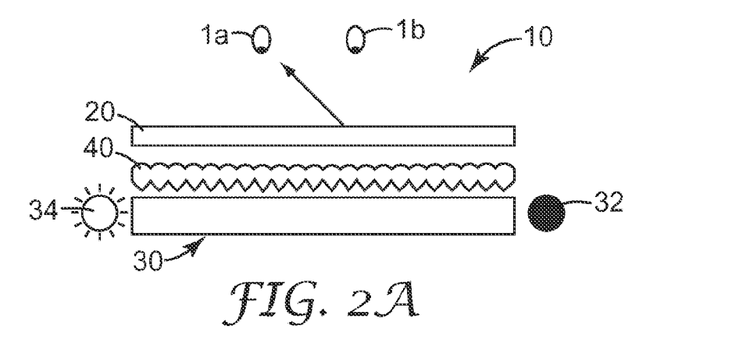
FIG. 2A and FIG. 2B are schematic side views of the illustrative display apparatus of FIG. 1 in operation.

FIG. 2A and FIG. 2B are schematic side views of an illustrative stereoscopic display apparatus 10 in operation. In FIG. 2A the left eye image solid state light source 34 is illuminated and the right eye image solid state light source 32 is not illuminated. In this state, the light emitted from the left eye image solid state light source 34 transmits through the backlight 30, through the double sided prism sheet 40, and liquid crystal panel 20 providing a first image view (i.e., left eye image) directed toward the left eye 1a of an viewer or observer.

Figure 2B:
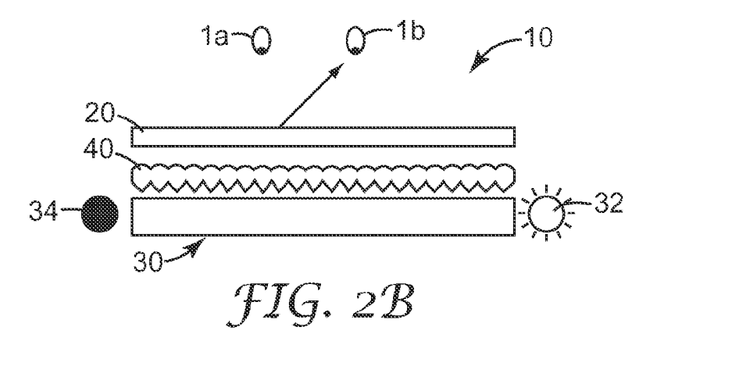

In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a second image view (i.e., right eye image) directed toward the right eye 1b of an viewer or observer.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized, otherwise cross-talk and a poor stereoscopic image will be perceived.

Figure 3:
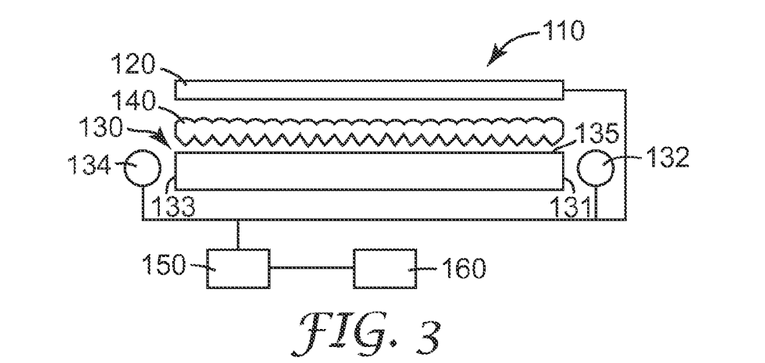
FIG. 3 is a schematic side view of another illustrative display apparatus.

FIG. 3 is a schematic side view of an illustrative dual view 2D display apparatus 110. The display apparatus includes a liquid crystal display panel 120, as described above, and a backlight 130 positioned to provide light to the liquid crystal display panel 120, as described above. The backlight 130 includes a right view image solid state light source 132 and a left view image solid state light source 134 capable of being modulated between the right view image solid state light source 132 and the left view image solid state light source 134 at a rate of at least 90 Hertz, as described above. A double sided prism film 140 is disposed between the liquid crystal display panel 120 and the backlight 130.

A synchronization driving element 150 is electrically connected to the backlight 130 light sources 132, 134 and the liquid crystal display panel 120. The synchronization driving element 150 synchronizes activation and deactivation (i.e., modulation) of the right view image solid state light source 132 and the left view image solid state light source 134, as described above. An image (e.g., video or computer rendered graphics) source 160 is connected to the synchronization driving element 150 and provides the images frames (e.g., right view images and left view images) to the liquid crystal display panel 120, as described above.

The backlight 130 can be any useful backlight, as described above. The illustrated backlight 130 includes a first light input surface 131 adjacent to the right view image solid state light source 132 and an opposing second light input surface 133 adjacent to the left view image solid state light source 134 and a light output surface 135. The solid state light sources can be any useful solid state light source, as described above.

The double sided prism film 140 can be any useful prism film having a lenticular structure on a first side and a prismatic structure on an opposing side, as described above. The double sided prism film 140 transmits light from the backlight to the liquid crystal display panel 120 at the proper angles such that each viewer perceives the proper displayed image. Useful, double sided prism films are described in United States Patent Applications Publication Nos. 2005/0052750 and 2005/0276071, which are incorporated herein by reference as if fully set forth. While this reference describes a double sided prism films useful for a 3D image, the prism open angles and pitch can be modified to separate the output viewing angle of each image view so as to separate the two image views for viewing by two viewers. For example, the prism open angle can be in a range from 70 to 89 degrees and the prism pitch can be in a range from 1 to 50 micrometers to form the proper output viewing angle of each image view for a 2D dual view display. In other embodiments, the double sided prism film is not needed for a 2D multiview display, as described below.

The image source 160 can be any useful image source capable of providing images frames (e.g., first image view and left image views) such as, for example, a video source or a computer rendered graphic source, as described above. The synchronization driving element 150 can include any useful driving element providing synchronizing activation and deactivation (i.e., modulation) of the right view image solid state light source 132 and the left view image solid state light source 134 with image frames provided at a rate of 90 frames per second or greater to the liquid crystal display panel 120 to produce a flicker-free video or rendered computer graphics, as described above.

Figure 4A:
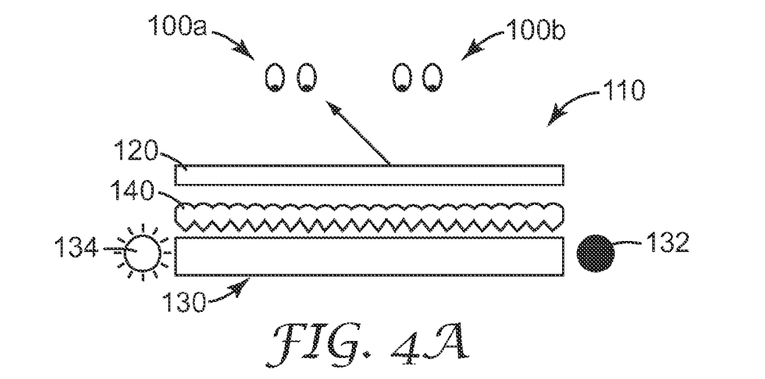
FIG. 4A and FIG. 4B are schematic side views of the illustrative display apparatus of FIG. 3 in operation.

FIG. 4A and FIG. 4B are schematic side views of the illustrative dual view display apparatus 110 in operation. In FIG. 4A the left view image solid state light source 134 is illuminated and the right view image solid state light source 132 is not illuminated. In this state, the light emitted from the left view image solid state light source 134 transmits through the backlight 130, through the double sided prism sheet 140, and liquid crystal panel 120 providing a first image view (i.e., left view image) directed toward the left viewer 100a or observer 100a.

Figure 4B:
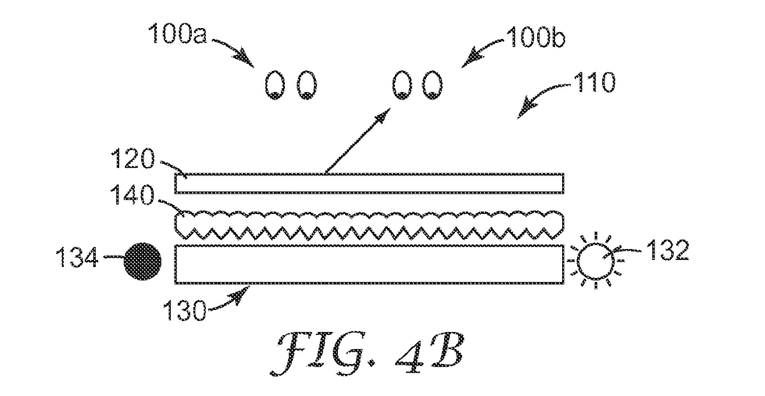

In FIG. 4B the right view image solid state light source 132 is illuminated and the left view image solid state light source 134 is not illuminated. In this state, the light emitted from the right view solid state light source 132 transmits through the backlight 130, through the double sided prism sheet 140, and liquid crystal panel 120 providing a second image view (i.e., right view image) directed toward the right viewer 100b or observer 100b.

The methods to reduce perceived image cross-talk described herein can also be applied to displays that display three or more distinct image views. Illustrative examples of multiview 2D/3D displays are described in, for example, IJzerman et al., "Design of 2D/3D Switchable Displays", SID 2005 DIGEST, pg. 98-101: and Kim et al., "A 2.4 inch 4-view 3D Display", IDW 2007, pg. 2263-2266, which are incorporated herein by reference as if fully set forth. Some of these displays provide multiview images to the display simultaneously.

This disclosure describes conditioning the image views to reduce perceived image crosstalk in a multiview display. This conditioning includes subtractive crosstalk reduction by altering or modifying pixel intensity of each image view (i.e., one or more of the image views) so that the perceived image has a reduced amount of perceived image crosstalk thereby improving the viewing experience for an observer(s). The general idea is to subtract an amount of intensity form at least selected or each pixel in the displayed image to compensate for the perceived image leakage of intensity from the prior or subsequent image frame. In some embodiments, the image color intensity scale is re-scaled so that the displayed pixel has an initial intensity so as to allow one to modify the initial intensity the required amount. The method can be accomplished via software solution and implemented in real time, as described below.

These methods includes providing an image stream to a display and conditioning the image stream pixel color intensity to reduce perceived image crosstalk in the multiview display. The image stream includes a temporal sequence of images where at least a first image view and then a second image view is displayed on the display in a time sequential manner, or in a simultaneously manner. Crosstalk is determined and corrected as a function (non-constant) of the display width or along a horizontal dimension of the display.

A method of non-uniform cross-talk reduction as a function of screen height for stereoscopic CRT displays that suffer from phosphor after-glow is described in a journal article to Smit et al., "Non-Uniform Crosstalk Reduction for Dynamic Scenes," IEEE Virtual Reality Conference 2007 Mar. 10-14, pages 139-146, which is incorporated herein by reference as if fully set forth.

Figure 5:
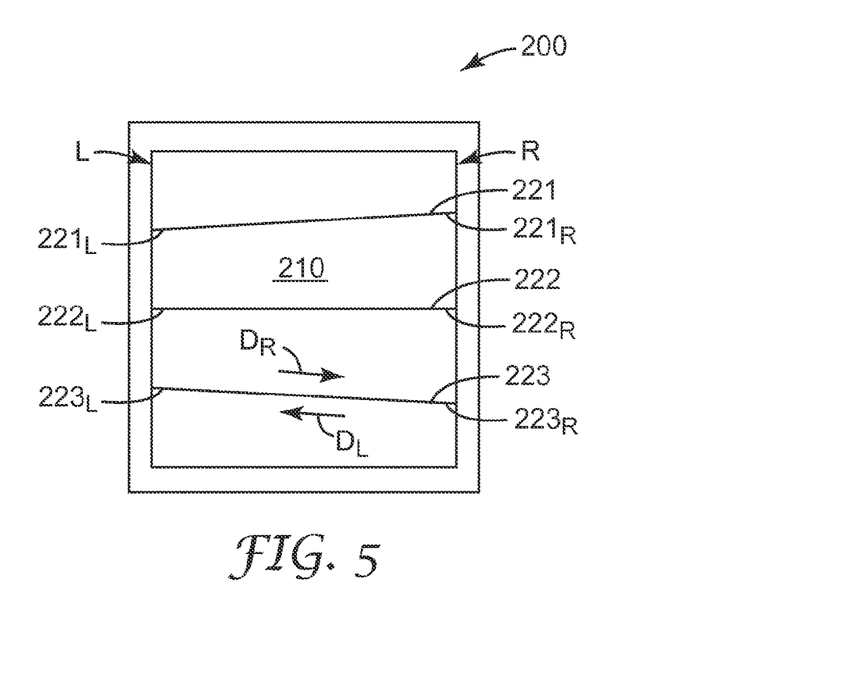
FIG. 5 is a schematic front elevation view of an illustrative display.

Referring to FIG. 5, the display 200 includes a horizontal dimension 221, 222, 223 (i.e., across a width of display) that extend from a first side R of the display to an opposing second side L of the display. The horizontal dimension 221, 222, 223 has a first end $221_R$, $222_R$, $223_R$ and an opposing second end $221_L$, $222_L$, $223_L$, defining a length therebetween. The horizontal dimension 221, 222, 223 is formed by a plurality of points, pixels, or areas on the display that extend horizontally across the width of the display from the first end to the second end, or vice versa. The horizontal dimension can extend straight 222 across the display or in a diagonal 221, 223 across the display.

The images or temporal sequence of images are conditioned or modified before the being displayed on the display to reduce perceived displayed image crosstalk between the, at least, first image view and the second image view. The conditioning includes modifying a color intensity of, at least selected, pixels along, the horizontal dimension based on a non-constant crosstalk correction function for the horizontal dimension.

Figure 6:
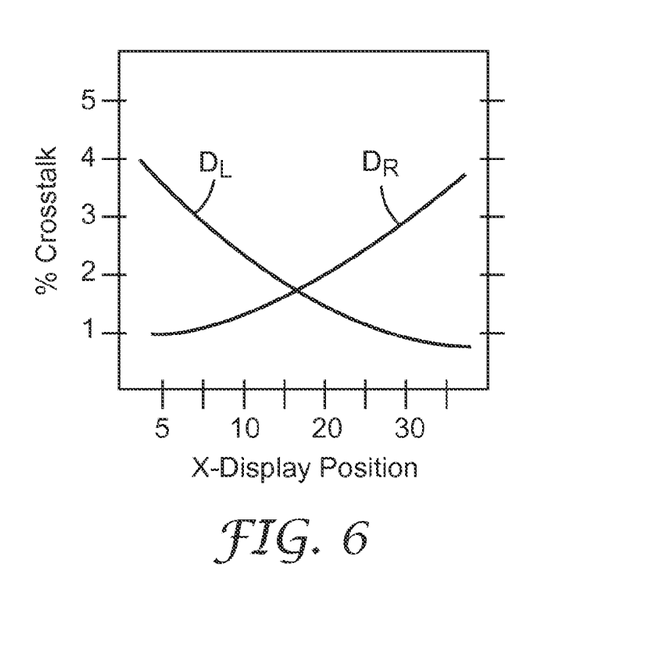
FIG. 6 is an illustrative graph of % cross-talk along a horizontal pixel line in a first direction and a second direction.

FIG. 6 is an illustrative graph of % cross-talk along a horizontal dimension in a first direction $D_L$ and a second direction $D_R$. In many embodiments, the % cross-talk is a non-constant function across the horizontal direction $D_R$ or $D_L$ or length of the horizontal dimension. In many embodiments, the % cross-talk is a non-linear function across the horizontal direction $D_R$ or $D_L$ or length of the horizontal dimension. In some embodiments, the % cross-talk is a linear function across the horizontal direction $D_R$ or $D_L$ or length of the horizontal dimension. In many embodiments, the % cross-talk is a different function along the horizontal dimension in a first direction $D_L$ than the % cross talk function in the second direction $D_R$ along the horizontal dimension. In addition the horizontal dimension can have a distinct % cross-talk along the horizontal dimension in a first direction $D_L$ and a second direction $D_R$. In many embodiments, these % cross-talk values across the horizontal dimension are empirically determined for a specific display and then a curve-fit analysis provides the function or equation (as a function of width or length) useful for the method described herein.

In some embodiments, color intensity of each color is resealed to that the modified color intensity of each color is within the color intensity range for that color. The color intensity range can be any useful range such as, for example, 0 to 63 (6 bit), or 0 to 255 (8 bit), 0 to 1023 (10 bit), or 12 bit, or 14 bit, or 16 bit. Thus for example, an 8-bit color intensity could be resealed to 20 to 255 if the desired pixel color intensity is 10 and modified pixel color intensity is set to 0.

Figure 7:
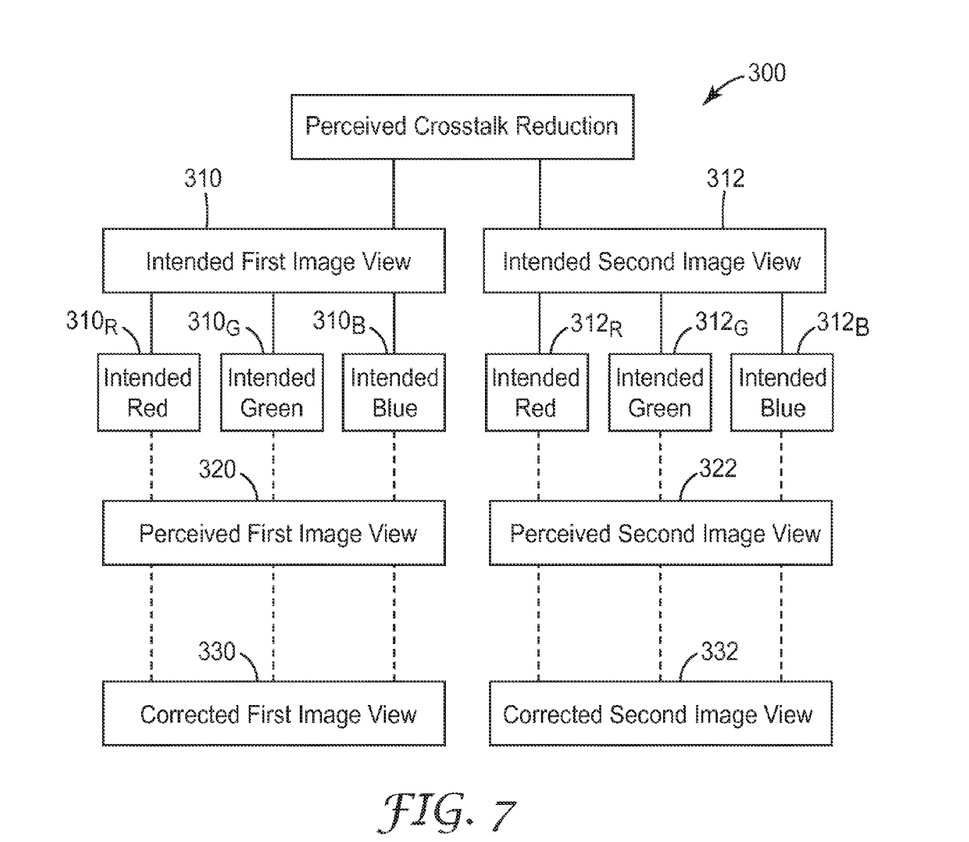
FIG. 7 is a flow diagram of one illustrative method of reducing perceived image crosstalk in a multiview display.

FIG. 7 is a flow diagram 300 of one illustrative method of reducing perceived image crosstalk in a multiview display. The first step is to identify the intended images at block 310 for the first image view and at block 312 for the second image view. In this example, a color intensity value for red $310_R$, $312_R$, green $310_G$, $312_G$, and blue $310_B$, $312_B$ is determined for each intended image view. The color map can be any useful color map including color maps other than the exemplified RGB color map.

The perceived image, block 320, 322 is a combination of one minus the cross-talk percentage of the intended plus the cross-talk percentage of the unintended image view, for each color intensity value. For example, if the intended pixel value is 10 and the amount of cross-talk at that particular display position is 10 percent, and the unintended image pixel value is 100, then the predicted perceived pixel value would be 19.

Thus, the corrected image, block 330, 332 equals the intended image plus the difference between the intended image and the predicted perceived image. For example, if at a given pixel in the intended image color intensity should be 10 and the pixel is predicted perceived to be 19 due to 10% cross-talk from the unintended image at that pixel, then the pixel in the corrected image would be 1.

For example, assuming a display with uniform 10 percent crosstalk where what reaches the viewer AFTER CORRECTION is a combination of 90 percent of the corrected intended image and 10 percent of the corrected unintended image. Where the intended pixel value without correction is 10 and the unintended pixel value without correction is 100. Predicted Perceived for the first image due to 10 percent crosstalk=0.9*10+0.1*100=19. Predicted Perceived for the second image due to 10 percent crosstalk=0.9*100+0.1*10=91. Note that the difference between predicted perceived without correction and intended for the first image=19−10=9, so the correction factor the first image would be −9. Note that the difference between predicted perceived without correction and intended for the second image=91−100=−9, so the correction factor the first image would be 9. Thus Predicted Perceived AFTER CORRECTION for the first image due to 10 percent crosstalk=0.9*(10−9)+0.1*(100+9)=11.8. Thus Predicted Perceived AFTER CORRECTION for the second image due to 10 percent crosstalk=0.9*(100+9)+0.1*(10−9)=98.2. These Predicted Perceived AFTER CORRECTION are closer to the intended values but they do not correct completely for the crosstalk in the display. There are a number of ways that this could be improved, such as when the Predicted Perceived AFTER CORRECTION does not equal the intended, run the loop again.

Thus one possible implementation of this method includes: for i=1:Image_height; and for j=Image_width; and where A=First Image View Color Intensity; B=Second Image View Color Intensity; and k and l are functions (i.e., equations) characterizing the display in terms of cross-talk horizontally across the display in a first direction (i.e., k) and in a second opposing direction (i.e., l) for a given pixel line of the display.

$$k=((0.0000012712*(j)^2)-(0.001655478*(j))+(0.1049456489))$$

$$l=((0.0000012712*(j)^2)-(0.0011565091*(j))+(0.3625955732))$$

$$\text{Perceived\_}A\_\text{Red}(i,j)=((1-k)*\text{Intended\_}A\_\text{Red}(i,j)+k*\text{Intended\_}B\_\text{Red}(i,j)$$

$$\text{Corrected\_}A\_\text{Red}(i,j)=\text{Intended\_}A\_\text{Red}(i,j)+(\text{Intended\_}A\_\text{Red}(i,j)-\text{Perceived\_}A\_\text{Red}(i,j))$$

Figure 8:
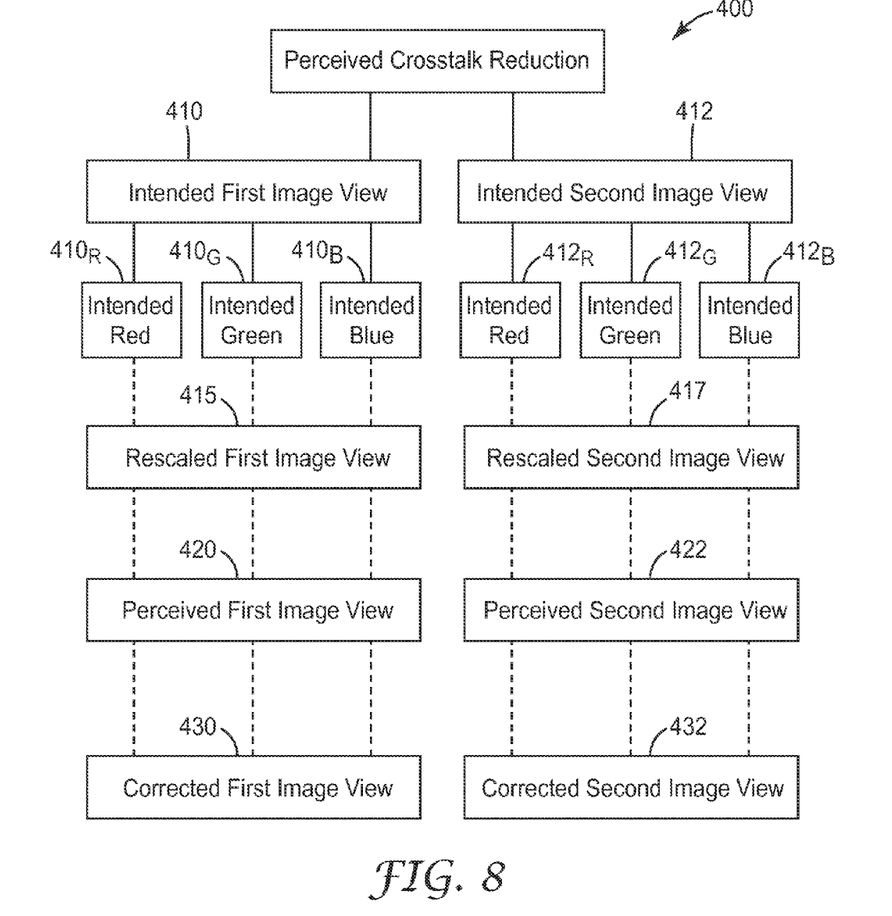
FIG. 8 is a flow diagram of another illustrative method of reducing perceived image crosstalk in a multiview display.

FIG. 8 is a flow diagram 400 of another illustrative method of reducing perceived image crosstalk in a multiview display. The first step is to identify the intended images at block 410 for the first image view and at block 412 for the second image view. In this example, a color intensity value for red $410_R$, $412_R$, green $410_G$, $412_G$, and blue $410_B$, $412_B$ is determined for each intended image view.

Then the intended image views 410 and 412 color intensity values for red $410_R$, $412_R$, green $410_G$, $412_G$, and blue $410_B$, $412_B$ are each independently rescaled at block 415, and block 417, so that the corrected images at block 430 and block 432 maintain the original color intensity scale (e.g., 0 to 255 for an 8-bit scale). This rescaling makes perceived crosstalk reduction possible for all pixel values (i.e., without rescaling perceived crosstalk reduction may not be possible for some pixel values.) One possible implementation includes:

$$\text{correction\_factor}=((255-((255*(1-\text{maximum\_crosstalk\_percentage}))+(\text{crosstalk\_percentage}*0)))); \text{ and} \qquad 1)$$

$$\text{Rescaler}=1-(2*\text{maximum\_crosstalk\_percentage in the display}). \qquad 2)$$

This implementation is assuming the maximum rescaling is necessary. That is, the implementation is assuming that for at least one pixel location there is the condition where one of the intended images value is 255 and the corresponding pixel value in a second intended is 0. Thus, this implementation can be characterized with the following equations, where A=First Image View Color Intensity; B=Second Image View Color Intensity:

$$\text{Rescaled\_}A\_\text{Red}=\text{intended\_}A\_\text{Red}*\text{Rescaler}+\text{correction factor}$$

$$\text{Rescaled\_}B\_\text{Red}=\text{intended\_}B\_\text{Red}*\text{Rescaler}+\text{correction factor}$$

$$\text{Rescaled\_}A\_\text{Green}=\text{intended\_}A\_\text{Green}*\text{Rescaler}+\text{correction factor}$$

$$\text{Rescaled\_}B\_\text{Green}=\text{intended\_}B\_\text{Green}*\text{Rescaler}+\text{correction factor}$$

$$\text{Rescaled\_}A\_\text{Blue}=\text{intended\_}A\_\text{Blue}*\text{Rescaler}+\text{correction factor}$$

$$\text{Rescaled\_}B\_\text{Blue}=\text{intended\_}B\_\text{Blue}*\text{Rescaler}+\text{correction factor}$$

The perceived image, block 320, 322 is a combination of one minus the cross-talk percentage of the resealed image view plus cross-talk percentage of the unintended resealed image view, for each color intensity value. For example, if the intended resealed pixel value is 10 and the amount of cross-talk at that particular display position is 10 percent, and the unintended resealed image pixel value is 100, then the predicted perceived pixel value would be 19.

Thus, the corrected image, block 330, 332 equals the resealed intended image plus the difference between the resealed intended image and the predicted perceived image. For example, if at a given pixel in the intended resealed image should be 10 and the pixel is predicted perceived is 19 due to X amount of cross-talk from the unintended image, then the pixel in the corrected image would be 1.

Thus one possible implementation of this method includes: for i=1:Image_height; and for j=Image-width; and k and l are functions (i.e., equations) characterizing the display in terms of cross-talk horizontally across the display in a first direction (i.e., k) and in a second opposing direction (i.e., l) for a given pixel line of the display.

$$k=((0.0000012712*(j)^2)-(0.001655478*(j))+(0.1049456489))$$

$$l=((0.0000012712*(j)^2)-(0.0011565091*(j))+(0.3625955732))$$

$$\text{Perceived\_}A\_\text{Red}(i,j)=((1-k)*\text{Rescaled\_}A\_\text{Red}(i,j)+k*\text{Rescaled\_}B\_\text{Red}(i,j)$$

$$\text{Corrected\_}A\_\text{Red}(i,j)=\text{Rescaled\_}A\_\text{Red}(i,j)+(\text{Rescaled\_}A\_\text{Red}(i,j)-\text{Perceived\_}A\_\text{Red}(i,j))$$

EXAMPLE

The following is an example software program code useful for implementing at least selected methods of reducing perceived image crosstalk in a multiview display.

```
---------------- Perceived Crosstalk Reduction Method ----------------
The following is a description of the perceived crosstalk reduction method: Determine the
absolute difference of pixels (x, y, z) left and right set = to k. Percentage ipsilateral is
defined by (100 minus k times ((the percentage of crosstalk at that part of the display for
that view) divided by 255).
--------------------------- Load Stereopair ---------------------------
globe = imread('GL_MMM0000.jpg'); intended_left = globe(:,1:640,:); intended_right =
globe(:,641:1280,:);
intended_left = imread('map.tif');
intended_right = imread('mnt.tif');
crosstalk_percentage = .3626;
Need to determine the maximum amt of crosstalk in the display see calculations i,j,k,l
---------------- Resize image to display width in pixels ----------------
intended_left = imresize(intended_left, [NaN 640]);
intended_right = imresize(intended_right, [NaN 640]);
intended_left = double(intended_left);
intended_right = double(intended_right);
altered_left = intended_left;
altered_right = intended_right;
--------------- Seperate into Red, Green, Blue Components ---------------
intended_left_r = intended_left(:,:,1);
intended_left_g = intended_left(:,:,2);
intended_left_b = intended_left(:,:,3);
intended_right_r = intended_right(:,:,1);
intended_right_g = intended_right(:,:,2);
intended_right_b = intended_right(:,:,3);
-------------------------- Determine Image Size ----------------------
Image_size = size(intended_left);
Image_height = Image_size(1,1);
Image_width = Image_size(1,2);
Image_width_cropped = Image_width – 50;
------------------------ Define New Lefts and Rights ------------------
Perceived_left_r = intended_left_r;
Perceived_right_r = intended_right_r;
Corrected_left_r = intended_left_r;
Corrected_right_r = intended_right_r;
Perceived_left_g = intended_left_g;
Perceived_right_g = intended_right_g;
Corrected_left_g = intended_left_g;
Corrected_right_g = intended_right_g;
Perceived_left_b = intended_left_b;
Perceived_right_b = intended_right_b;
Corrected_left_b = intended_left_b;
Corrected_right_b = intended_right_b;
Predicted_left_r = intended_left_r;
Perceived_after_correction_left_r = intended_left_r;
Predicted_right_r = intended_right_r;
Perceived_after_correction_right_r = intended_right_r;
Predicted_left_g = intended_left_g;
Perceived_after_correction_left_g = intended_left_g;
Predicted_right_g = intended_right_g;
Perceived_after_correction_right_g = intended_right_g;
Predicted_left_b = intended_left_b;
Perceived_after_correction_left_b = intended_left_b;
Predicted_right_b = intended_right_b;
Perceived_after_correction_right_b = intended_right_b;
--- Rescale IntL and IntR so that CorL and CorR are between 0 and 255 ---
Rescaler = (max – (2*maximum_adjustment)/max. For maximum crosstalk percentage of
36.26% the appropriate rescaler = ((255–(2*92.463))/255) = 0.2748. Offset =
max_adjustment or 92.463.
correction_factor = ((255 – ((255*(1–crosstalk_percentage))+(crosstalk_percentage*0))));
Rescaler = 1 – (2*crosstalk_percentage);
Rescaled_left_r = intended_left_r.*Rescaler + correction_factor;
Rescaled_right_r = intended_right_r.*Rescaler + correction_factor;
Rescaled_left_g = intended_left_g.*Rescaler + correction_factor;
Rescaled_right_g = intended_right_g.*Rescaler + correction_factor;
Rescaled_left_b = intended_left_b.*Rescaler+ correction_factor;
Rescaled_right_b = intended_right_b.*Rescaler + correction_factor;
---------- Determine Perceived and Corrected for both views ------------
```

This part of the code 1) predicts what each eyeview would perceive if presented with the resealed left and right eye-views on a pixel by pixel basis (horizontally across the display) based on the previously determined or predicted crosstalk percentage equation; 2) Determine the appropriate corrected eye-view images; Steps 3) and 4) Two methods of predicting what each eye-view would see after perceived crosstalk correction can be eliminated and were just calculated for theoretical purposes. Currently display only displays approximately middle 520 pixels so crosstalk measurement has only been done on those pixels thus only correct for those pixels with the appropriate rescaling.

```
for i = 1:Image_height;
    for j = 51:Image_width_cropped;
        k = ((0.0000012712*(j-50)^2) - (0.0001655478*(j-50)) + (0.1049456489));
        l = ((0.0000012712*(j-50)^2) - (0.0011565091*(j-50)) + (0.3625955732));
        Perceived_left_r(i,j) = ((1-k)*Rescaled_left_r(i,j) + k*Rescaled_right_r(i,j));
Corrected_left_r(i,j) = (Rescaled_left_r(i,j) + (Rescaled_left_r(i,j) -
    Perceived_left_r(i,j)));
Perceived_right_r(i,j) = ((1-l)*Rescaled_right_r(i,j) + l*Rescaled_left_r(i,j));
Corrected_right_r(i,j) = (Rescaled_right_r(i,j) + (Rescaled_right_r(i,j) -
    Perceived_right_r(i,j)));
Perceived_after_correction_left_r(i,j) = ((1-k)*Corrected_left_r(i,j) +
    k*Corrected_right_r(i,j));
Perceived_after_correction_right_r(i,j) = ((1-l)*Corrected_right_r(i,j) +
    l*Corrected_left_r(i,j));
Perceived_left_g(i,j) = ((1-k)*Rescaled_left_g(i,j) + k*Rescaled_right_g(i,j));
Corrected_left_g(i,j) = (Rescaled_left_g(i,j) + (Rescaled_left_g(i,j) -
    Perceived_left_g(i,j)));
Perceived_right_g(i,j) = ((1-l)*Rescaled_right_g(i,j) + l*Rescaled_left_g(i,j));
Corrected_right_g(i,j) = (Rescaled_right_g(i,j) + (Rescaled_right_g(i,j) -
    Perceived_right_g(i,j)));
Perceived_after_correction_left_g(i,j) = ((1-k)*Corrected_left_g(i,j) +
    k*Corrected_right_g(i,j));
Perceived_after_correction_right_g(i,j) = ((1-l)*Corrected_right_g(i,j) +
    l*Corrected_left_g(i,j));
Perceived_left_b(i,j) = ((1-k)*Rescaled_left_b(i,j) + k*Rescaled_right_b(i,j));
Corrected_left_b(i,j) = (Rescaled_left_b(i,j) + (Rescaled_left_b(i,j) -
    Perceived_left_b(i,j)));
Perceived_right_b(i,j) = ((1-l)*Rescaled_right_b(i,j) + l*Rescaled_left_b(i,j));
Corrected_right_b(i,j) = (Rescaled_right_b(i,j) + (Rescaled_right_b(i,j) -
    Perceived_right_b(i,j)));
Perceived_after_correction_left_b(i,j) = ((1-k)*Corrected_left_b(i,j) +
    k*Corrected_right_b(i,j));
Perceived_after_correction_right_b(i,j) = ((1-l)*Corrected_right_b(i,j) +
    l*Corrected_left_b(i,j));
Predicted_left_r(i,j) = ((1-k)*Corrected_left_r(i,j) + k*Rescaled_right_r(i,j));
Predicted_right_r(i,j) = ((1-l)*Corrected_right_r(i,j) + l*Rescaled_left_r(i,j));
Predicted_left_g(i,j) = ((1-k)*Corrected_left_g(i,j) + k*Rescaled_right_g(i,j));
Predicted_right_g(i,j) = ((1-l)*Corrected_right_g(i,j) + l*Rescaled_left_g(i,j));
Predicted_left_b(i,j) = ((1-k)*Corrected_left_b(i,j) + k*Rescaled_right_b(i,j));
Predicted_right_b(i,j) = ((1-l)*Corrected_right_b(i,j) + l*Rescaled_left_b(i,j));
    end
end
------------------- Restoring original file formatting ------------------
Once again, Predicted and Perceived_after_correction steps can be eliminated.
Corrected_left_r = uint8(Corrected_left_r);
Corrected_right_r = uint8(Corrected_right_r);
Corrected_left_g = uint8(Corrected_left_g);
Corrected_right_g = uint8(Corrected_right_g);
Corrected_left_b = uint8(Corrected_left_b);
Corrected_right_b = uint8(Corrected_right_b);
Predicted_left_r = uint8(Predicted_left_r);
Predicted_right_r = uint8(Predicted_right_r);
Predicted_left_g = uint8(Predicted_left_g);
Predicted_right_g = uint8(Predicted_right_g);
Predicted_left_b = uint8(Predicted_left_b);
Predicted_right_b = uint8(Predicted_right_b);
Perceived_left_r = uint8(Perceived_left_r);
Perceived_right_r = uint8(Perceived_right_r);
Perceived_left_g = uint8(Perceived_left_g);
Perceived_right_g = uint8(Perceived_right_g);
Perceived_left_b = uint8(Perceived_left_b);
Perceived_right_b = uint8(Perceived_right_b);
Perceived_after_correction_left_r = uint8(Perceived_after_correction_left_r);
Perceived_after_correction_right_r = uint8(Perceived_after_correction_right_r);
Perceived_after_correction_left_g = uint8(Perceived_after_correction_left_g);
Perceived_after_correction_right_g = uint8(Perceived_after_correction_right_g);
Perceived_after_correction_left_b = uint8(Perceived_after_correction_left_b);
Perceived_after_correction_right_b = uint8(Perceived_after_correction_right_b);
----------------------- Combine r,g,b layers -----------------------
Once again, Predicted, Perceived, and Perceived_after_correction steps can be eliminated.
altered_left(:,:,1) = Corrected_left_r;
altered_left(:,:,2) = Corrected_left_g;
```

```
altered_left(:,:,3) = Corrected_left_b;
altered_right(:,:,1) = Corrected_right_r;
altered_right(:,:,2) = Corrected_right_g;
altered_right(:,:,3) = Corrected_right_b;
predicted_left(:,:,1) = Predicted_left_r;
predicted_left(:,:,2) = Predicted_left_g;
predicted_left(:,:,3) = Predicted_left_b;
predicted_right(:,:,1) = Predicted_right_r;
predicted_right(:,:,2) = Predicted_right_g;
predicted_right(:,:,3) = Predicted_right_b;
Perceived_left(:,:,1) = Perceived_left_r;
Perceived_left(:,:,2) = Perceived_left_g;
Perceived_left(:,:,3) = Perceived_left_b;
Perceived_right(:,:,1) = Perceived_right_r;
Perceived_right(:,:,2) = Perceived_right_g;
Perceived_right(:,:,3) = Perceived_right_b;
Perceived_after_correction_left(:,:,1) = Perceived_after_correction_left_r;
Perceived_after_correction_left(:,:,2) = Perceived_after_correction_left_g;
Perceived_after_correction_left(:,:,3) = Perceived_after_correction_left_b;
Perceived_after_correction_right(:,:,1) = Perceived_after_correction_right_r;
Perceived_after_correction_right(:,:,2) = Perceived_after_correction_right_g;
Perceived_after_correction_right(:,:,3) = Perceived_after_correction_right_b;
------------------------- Write Images to File ------------------------
One does not need to write the Perceived, Predicted, or Predicted_after_correction
imwrite(uint8(altered_left),'CPCR_map.tif','TIFF');
imwrite(uint8(altered_right),'CPCR_mnt.tif','TIFF');
imwrite(uint8(Perceived_left),'CPCR_map_perceived.tif','TIFF');
imwrite(uint8(Perceived_right),'CPCR_mnt_perceived.tif','TIFF');
imwrite(uint8(predicted_left),'CPCR_map_predicted.tif','TIFF');
imwrite(uint8(predicted_right),'CPCR_mnt_predicted.tif','TIFF');
imwrite(uint8(Perceived_after_correction_left),'CPCR_map_predicted_afterPCR.tif','TIFF');
imwrite(uint8(Perceived_after_correction_right),'CPCR_mnt_predicted_afterPCR.tif','TIFF');
```

Thus, embodiments of the METHODS OF REDUCING PERCEIVED IMAGE CROSSTALK IN A MULTIVIEW DISPLAY are disclosed. One skilled in the art will appreciate that the present invention can be practiced with embodiments other than those disclosed. The disclosed embodiments are presented for purposes of illustration and not limitation, and the present invention is limited only by the claims that follow and their equivalents.

What is claimed is:

1. A method of reducing perceived image crosstalk in a multiview display comprising:
providing an image stream to a display, the display comprising a horizontal dimension that extends from a first side of the display to an opposing second side of the display, the image stream comprising a temporal sequence of images where at least a first image view and then a second image view is displayed on the display in a time sequential manner;
conditioning the temporal sequence of images before the temporal sequence of images is displayed on the display to reduce perceived displayed image crosstalk between the at least first image view and the second image view, the conditioning comprising modifying a color intensity of, at least selected, pixels along the horizontal dimension based on a non-constant crosstalk correction equation that is a function of a width value of the display.

2. A method according to claim 1, wherein the non-constant crosstalk correction equation is determined empirically for the horizontal dimension.

3. A method according to claim 1, wherein a first non-constant crosstalk correction equation is determined for the horizontal dimension for the first image view from the first side to the second side and a second non-constant crosstalk correction equation is determined for the horizontal dimension for the second image view from the second side to the first side.

4. A method according to claim 1, wherein the image stream provides an autostereoscopic display and the first image view provides images primarily to a right eye of a viewer of the display and the second image view provides images primarily to a left eye of the view of the display, forming a perceived three dimensional display image.

5. A method according to claim 1, wherein the image stream provides a dual view display and the first image view provides images primarily to a first viewer of the display and the second image view provides images primarily to a second viewer of the display.

6. A method according to claim 1, wherein the non-constant crosstalk correction equation is a non-linear equation that is a function of the horizontal dimension.

7. A method of reducing perceived image crosstalk in a multiview display comprising:
providing an image stream to a display, the display comprising a horizontal dimension that extends from a first side of the display to an opposing second side of the display, the image stream comprising a temporal sequence of images where at least a first image view and then a second image view is displayed on the display in a time sequential manner; and
conditioning the first image view and the second image view of the image stream before the image stream is displayed on the display to reduce perceived displayed image crosstalk between the first image view and second image view, the conditioning comprising modifying a color intensity of, at least selected, pixels along the horizontal dimension based on a non-constant crosstalk correction equation that is a function of a width value of the display, and rescaling a color intensity range of the first image view and second image view so that the modified color intensity is within the color intensity range.

8. A method according to claim 7, wherein color intensity of each color is rescaled so that the modified color intensity of each color is within the color intensity range for that color.

9. A method according to claim 7, wherein the color intensity range is from 0 to 255 or from 0 to 1023.

10. A method according to claim 7, wherein the non-constant crosstalk correction equation is determined empirically for the horizontal dimension.

11. A method according to claim 7, wherein a first non-constant crosstalk correction equation is determined for the horizontal dimension for the first image view from the first side to the second side and a second non-constant crosstalk correction equation is determined for the horizontal dimension for the second image view from the second side to the first side.

12. A method according to claim 7, wherein the image stream provides an autostereoscopic display and the first image view provides images primarily to a right eye of a viewer of the display and the second image view provides images primarily to a left eye of the view of the display, forming a perceived three dimensional display image.

13. A method according to claim 7, wherein the image stream provides a dual view display and the first image view provides images primarily to a first viewer of the display and the second image view provides images primarily to a second viewer of the display.

14. A method according to claim 7, wherein the non-constant crosstalk correction equation is a non-linear equation that is a function of the horizontal dimension.

15. A method of reducing perceived image crosstalk in a multiview display comprising:

providing an image stream to a display, the display comprising a horizontal dimension that extends from a first side of the display to an opposing second side of the display, the image stream comprising at least a first image view and a second image view; and conditioning the first image view and the second image view before the first image view and a second image view is displayed on the display to reduce perceived displayed image crosstalk between the at least first image view and the second image view, the conditioning comprising modifying a color intensity of, at least selected, pixels along the horizontal dimension based on a non-constant crosstalk correction equation that is a function of a width value of the display.

16. A method according to claim 15, wherein the first image view and the second image view are displayed simultaneously on the display.

17. A method according to claim 15, wherein a first non-constant crosstalk correction equation is determined for the horizontal dimension for the first image view from the first side to the second side and a second non-constant crosstalk correction equation is determined for the horizontal dimension for the second image view from the second side to the first side.

18. A method according to claim 15, wherein the conditioning comprising rescaling a color intensity range of the first image view and second image view so that the modified color intensity is within the color intensity range.

* * * * *

UNITED STATES PATENT AND TRADEMARK OFFICE
CERTIFICATE OF CORRECTION

PATENT NO. : 8,339,333 B2
APPLICATION NO. : 11/968332
DATED : December 25, 2012
INVENTOR(S) : Glenn E. Casner It is certified that error appears in the above-identified patent and that said Letters Patent is hereby corrected as shown below:

Title Page 2, Column 1, Item (56) Other Publications
Line 1, Delete "Iizerman et al.," and insert -- Ijzerman et al., --, therefor.

IN THE SPECIFICATIONS:
Column 2
Line 11, Delete "resealing" and insert -- rescaling --, therefor.

Column 8
Line 45, Delete "resealed" and insert -- rescaled --, therefor.
Line 50, Delete "resealed" and insert -- rescaled --, therefor.

Column 9
Line 44, Delete "(0.001655478*(j))+" and insert -- (0.0001655478*(j))+ --, therefor.

Column 10
Line 1, Delete "resealing" and insert -- rescaling --, therefor.
Line 2, Delete "resealing" and insert -- rescaling --, therefor.
Line 11, Delete "resealing" and insert -- rescaling --, therefor.
Line 37, Delete "resealing" and insert -- rescaling --, therefor.
Line 38, Delete "resealing" and insert -- rescaling --, therefor.
Line 40, Delete "resealing" and insert -- rescaling --, therefor.
Line 42, Delete "resealing" and insert -- rescaling --, therefor.
Line 45, Delete "resealing" and insert -- rescaling --, therefor.
Line 46, Delete "resealing" and insert -- rescaling --, therefor.
Line 47, Delete "resealing" and insert -- rescaling --, therefor.
Line 58, Delete "(0.001655478*(j))+" and insert -- (0.0001655478*(j))+ --, therefor.

Column 11
Line 23, Delete "Seperate" and insert -- Separate --, therefor.

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,339,333 B2

Column 13
Line 2, Delete "resealed" and insert -- rescaled --, therefor.

IN THE CLAIMS:

Column 15
Line 49, In Claim 1, delete "manner;" and insert -- manner; and --, therefor.

Column 16
Line 61, In Claim 7, delete "resealing" and insert -- rescaling --, therefor.